United States Patent
Thompson et al.

(10) Patent No.: US 9,735,867 B2
(45) Date of Patent: Aug. 15, 2017

(54) MICROREFLECTION DELAY ESTIMATION IN A CATV NETWORK

(71) Applicant: ARRIS Enterprises, Inc., Suwanee, GA (US)

(72) Inventors: Robert J. Thompson, Monroeton, PA (US); John L. Moran, Millville, MA (US); Mark L. Fowler, Ithaca, NY (US)

(73) Assignee: ARRIS Enterprises LLC, Suwanee, GA (US)

( * ) Notice: Subject to any disclaimer, the term of this patent is extended or adjusted under 35 U.S.C. 154(b) by 101 days.

(21) Appl. No.: 14/261,967

(22) Filed: Apr. 25, 2014

(65) Prior Publication Data

US 2015/0311974 A1    Oct. 29, 2015

(51) Int. Cl.
*H04B 10/079* (2013.01)
*H04B 3/23* (2006.01)
*H04B 10/2575* (2013.01)

(52) U.S. Cl.
CPC ......... *H04B 10/0791* (2013.01); *H04B 3/235* (2013.01); *H04B 10/25751* (2013.01)

(58) Field of Classification Search
CPC ........................... H04B 3/235; H04B 10/0791
See application file for complete search history.

(56) References Cited

U.S. PATENT DOCUMENTS

| | | | |
|---|---|---|---|
| 6,687,632 B1 * | 2/2004 | Rittman | H04B 3/46 250/336.1 |
| 6,792,052 B1 * | 9/2004 | Johansson | H04B 7/005 375/340 |
| 8,526,485 B2 | 9/2013 | Thompson et al. | |
| 8,537,972 B2 | 9/2013 | Thompson et al. | |
| 2013/0176860 A1 * | 7/2013 | Wolcott | H04L 25/03019 370/242 |
| 2014/0003477 A1 * | 1/2014 | Williams | H04L 25/49 375/224 |
| 2014/0029655 A1 | 1/2014 | Thompson et al. | |

OTHER PUBLICATIONS

Hranac, R., "Adaptive Equalization" by Cisco Systems, Inc. Dated 2006. Link: http://home.comcast.net/~cypherx/Adaptiveequalization.ppt.
"Proactive Network Maintenance Using Pre-equalization", DOCSIS Best Practices and Guidelines, CM-GL-PNMP-V02-110623, Jun. 23, 2011, pp. 116-121.
R. Thompson, et al.,"Optimizing Upstream Throughput Using Equalization Coefficient Analysis" National Cable Television Association (NCTA) Show, Washington DC, Apr. 1-3, 2009.
Cable Television Laboratories, Inc., "DOCSIS Best Practices and Guidelines; Proactive Network Maintenance Using Pre-Equalization", CM-GL-PNMP-V02-110623, Jun. 23, 2011.
R. Thompson, et al., 64-QAM, 6.4MHz Upstream Deployment Challenges, Society of Cable Television Engineers (SCTE) Canadian Summit, Toronto Ontario Canada, Mar. 9-10, 2011.
R. Howald, et al., "Characterizing and Aligning the HFC Return Path for Successful DOCSIS Rollouts" Society of Cable Television Engineers (SCTE) Cable-Tec Expo, Denver CO, Oct. 28-30, 2009.
Cable Television Laboratories, Inc., "DOCSIS 3.0: Physical Layer Specification", CM-SP-PHYv3.0-I12-150305, Aug. 4, 2006.

* cited by examiner

*Primary Examiner* — Nathan Curs
(74) *Attorney, Agent, or Firm* — Lori Anne D. Swanson

(57) ABSTRACT

Systems and methods of estimating a distance to a cause of a micro-reflection in a CATV network.

21 Claims, 15 Drawing Sheets

MICROREFLECTION DELAY ESTIMATION IN A CATV NETWORK

CROSS-REFERENCE TO RELATED APPLICATIONS

None

BACKGROUND

The present disclosure relates to systems and methods that provide optical signals over a cable transmission network.

Cable television (CATV) networks have evolved significantly since first being deployed as relatively simple systems that delivered video channels one-way from a content provider. These early systems included transmitters that split a number of CATV channels among several frequency bands, each of approximately 6 MHz, time multiplexed those signals, and sent them to subscribers as an electrical signal through a network of coaxial transmission lines to cable modems or set-top boxes in subscribers homes. Early evolution of such systems permitted limited return communication from the subscribers back to the content provider either through telephone lines or a dedicated, small, low-frequency signal propagated onto the coaxial network.

Modern CATV networks differ from these early networks in several material respects. First, given the growth of content provided to customers over increasing distances, much of the coaxial transmission path has been replaced by fiber-optic lines, although the trunk lines and feeder cables to customer homes remain coaxial, and much of the content delivered to the provider for transmission is by an analog electrical signal that the provider must then convert to an optical signal for propagation onto the coaxial transmission grid. Nodes, located closer to the subscribers receive the optical signals from the transmitter and convert them to the electrical signals for delivery to the subscribers through the coaxial lines to the subscribers' homes. Such a network is commonly referred to as a Hybrid Fiber-Coax (HFC) system.

Second, in addition to delivering television content, modern HFC systems also deliver additional content including Video-on Demand (VOD) and data services such as Internet access. These services require not only a high-capacity transmission path in the direction from the content provider to the subscriber but require a high capacity transmission path in the direction from the subscriber back to the content provider. Additional quality is needed both for new high definition broadcast channels and for the narrowcast video and data services. The original HFC network has been successfully updated to deliver new services, but the pressure of HD, VOD, and data service requires further advances, thus there is significant continuing pressure to increase the quality of data sent over a HFC network.

DETAILED DESCRIPTION

Figure 1:
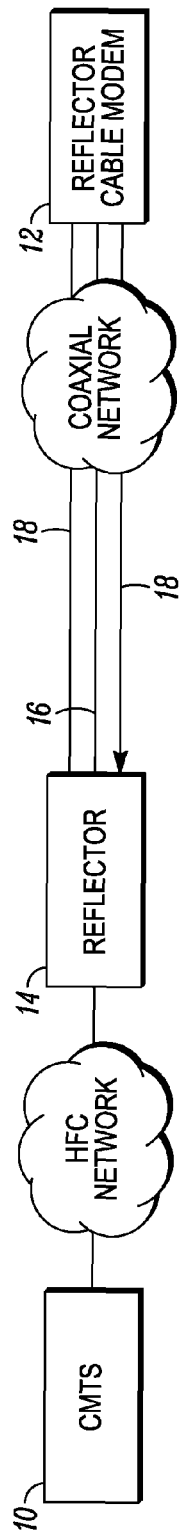
FIG. 1 shows an exemplary source of micro-reflection impairment.

Physically, existing downstream CATV content originates on the network from a head end, within which is a Cable Modem Termination System (CMTS). In the CMTS is typically a plurality of EdgeQAM units, which each receive encoded video signals, audio signals, and/or IP signals, and which each directly output a spectrum of amplitude-modulated analog signals at a defined frequency or set of frequencies to an RF combining network. The RF combining network in turn delivers the combined, modulated signals to a transmitter that converts the analog signals to optical signals and propagates those signals to a fiber optic network along a forward path to a receiver in a node. The node, in turn, converts the received optical signals back into electrical signals so that they may be delivered to subscribers through coaxial cables that terminate in the subscriber's homes. The node, conversely will also have equipment capable of receiving electrical signals from the subscribers, converting them to optical signals, and sending the optical signals to the CMTS along the fiber optic network, where the CMTS has a receiver capable of decoding and converting the signals back to the analog domain, respectively.

In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end. Also, it should be understood that, unless stated otherwise, the term "head end" will also encompass a "hub," which is a smaller signal generation unit downstream from a head end, often used for community access channel insertion and other purposes, that generally mimics the functionality of a head end, but may typically not include equipment such as satellite dishes and telephone equipment.

Directly-modulated EdgeQAM units have become increasingly sophisticated, offering successively higher densities, which in turn means that each EdgeQAM unit can process more channels of CATV data. For example, modern EdgeQAM modulation products can now simultaneously generate 32 or more channels on a single output port. With more channels being modulated per output port, the amount of combining required by the RF combining network 350 is reduced, with a corresponding simplification in the circuitry at the head end. The term 'QAM' is often used to interchangeably represent either: (1) a single channel typically 6 MHz wide that is Quadrature Amplitude Modulated (thus a "32 QAM system" is shorthand for a system with 32 Quadrature Amplitude Modulated channels; or (2) the depth of modulation used by the Quadrature Amplitude Modulation on a particular channel, e.g. 256 QAM means the signal is modulated to carry 8 bits per symbol while 4096 QAM means the signal is modulated to carry 12 bits per symbol. A higher QAM channel count or a higher QAM modulation means that a higher number of content "channels" can be delivered over a transmission network at a given standard of quality for audio, video, data, etc. QAM channels are constructed to be 6 MHz in bandwidth in North America, to be compatible with legacy analog TV channels and other existing CATV signals. However, more than one video program or cable modem system data stream may be digitally encoded within a single QAM channel. The term channel is unfortunately often used interchangeably, even though a QAM channel and a video program are not often the same entity—multiple video programs can be and usually are encoded within a single 6 MHz QAM channel. In this case, the modern EdgeQAM modulation products generate multiple instances of the 6 MHz bandwidth QAM channels. This simplifies the head end structure since some subset of the RF combining is now performed within the EdgeQAM units rather than in the external RF combining network. Packaging multiple QAM generators within a single package also offers some economic value.

One existing source of impairment on the quality of signals sent between components in an HFC network is micro-reflections. Micro-reflections are generally defined as digital signal copies, which are delayed in time due to traveling a path longer than that intended. Micro-reflections are analogous to echoes within the CATV network, and though they can manifest within CATV networks in a variety of ways, they are mostly due to faulty equipment that also reflect a signal, rather than simply propagating it in a desired direction. FIG. 1 illustrates one example of how a micro-reflection can occur in a network. This figure shows a transmission path between a CMTS 10 in a head end and a cable modem 12 in a subscriber's home. In this figure, a signal 16 is sent along a return path from the cable modem 12 to the head end 10, but is reflected by a defective component 14, typically a damaged cable, or a corroded or loose connector, essentially exhibiting the properties of a less than ideal match. A portion of the digital signal then propagates back along path 18 toward the cable modem 12, which then reflects the signal again. The cable modem 12 is designed to support at least a 6 dB return loss. The 6 dB return loss equates to approximately 25% of the incident signal power that will be reflected. In the CATV network, design tolerances typically produce much better results, but over time performance will degrade as the plant gets older and elements that contribute to good RF matching degrade.

The total delay associated with a micro-reflection is directly related to the length of cable(s) associated with the micro-reflection path.

Figure 2:
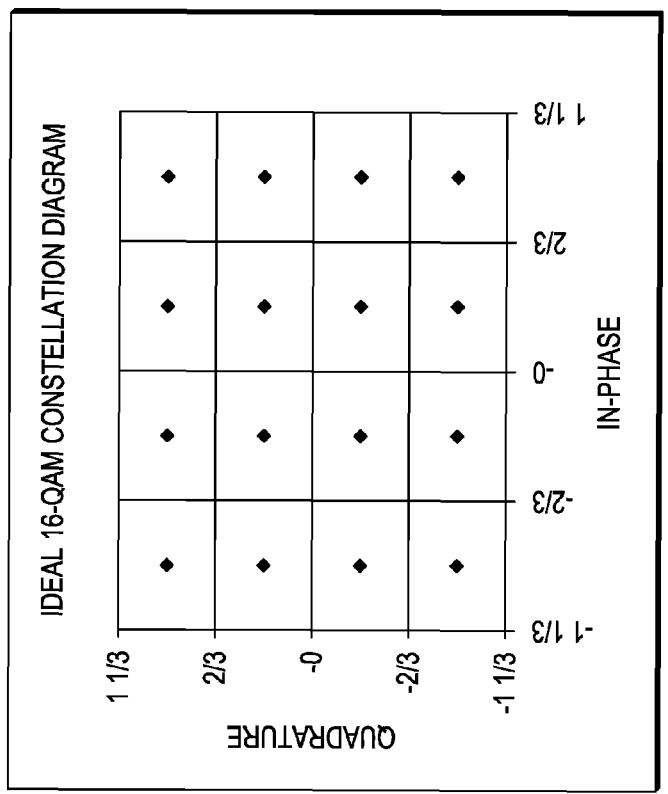
FIG. 2 shows an ideal constellation for a 16-QAM signal.
Figure 3:
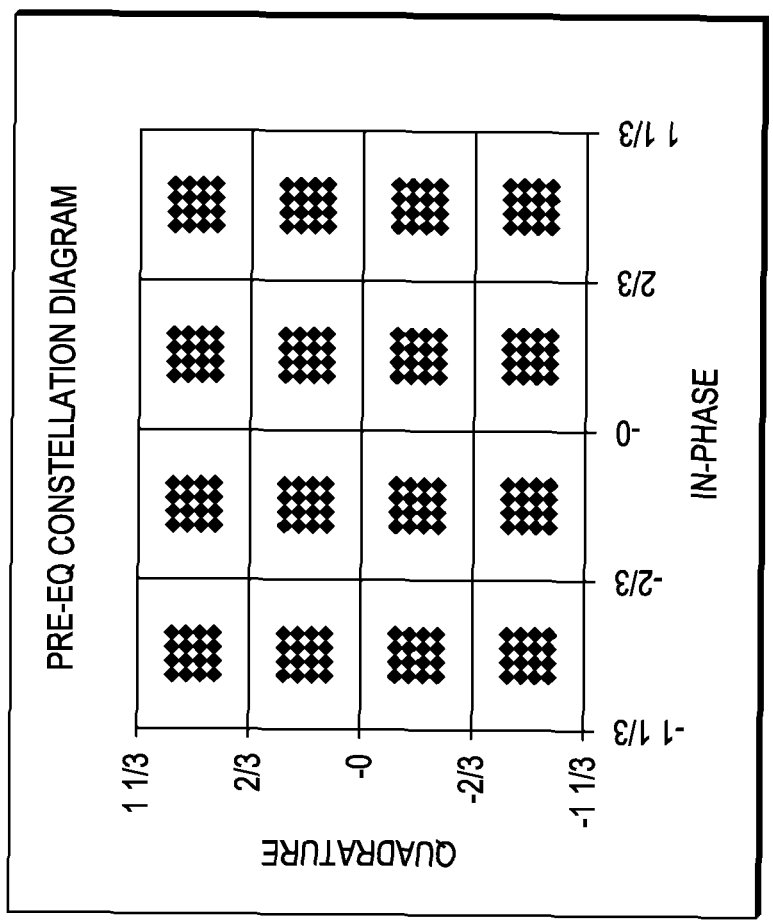
FIG. 3 shows a constellation for a 16-QAM signal that is impaired by micro-reflection.

Micro-Reflections are commonly considered within the CATV industry as linear distortion, meaning that the impairment will change by one decibel for a decibel change in the digital signal level. The effect that micro-reflections have on digital signals is Inter-Symbol Interference (ISI). When viewing a demodulated constellation impaired by a micro-reflection, the digital symbols will be spread from their ideal constellation points, as illustrated by FIGS. 2 and 3. FIG. 2 illustrates an ideal constellation for a 16-QAM signal. The pattern in which the individual symbols will spread can be observed as a miniaturized constellation in very low noise systems. FIG. 3, however, illustrates a 16-QAM constellation impaired by Micro-Reflection whose relative amplitude is −20 dBc and delay is 4 symbol periods.

Figure 4:
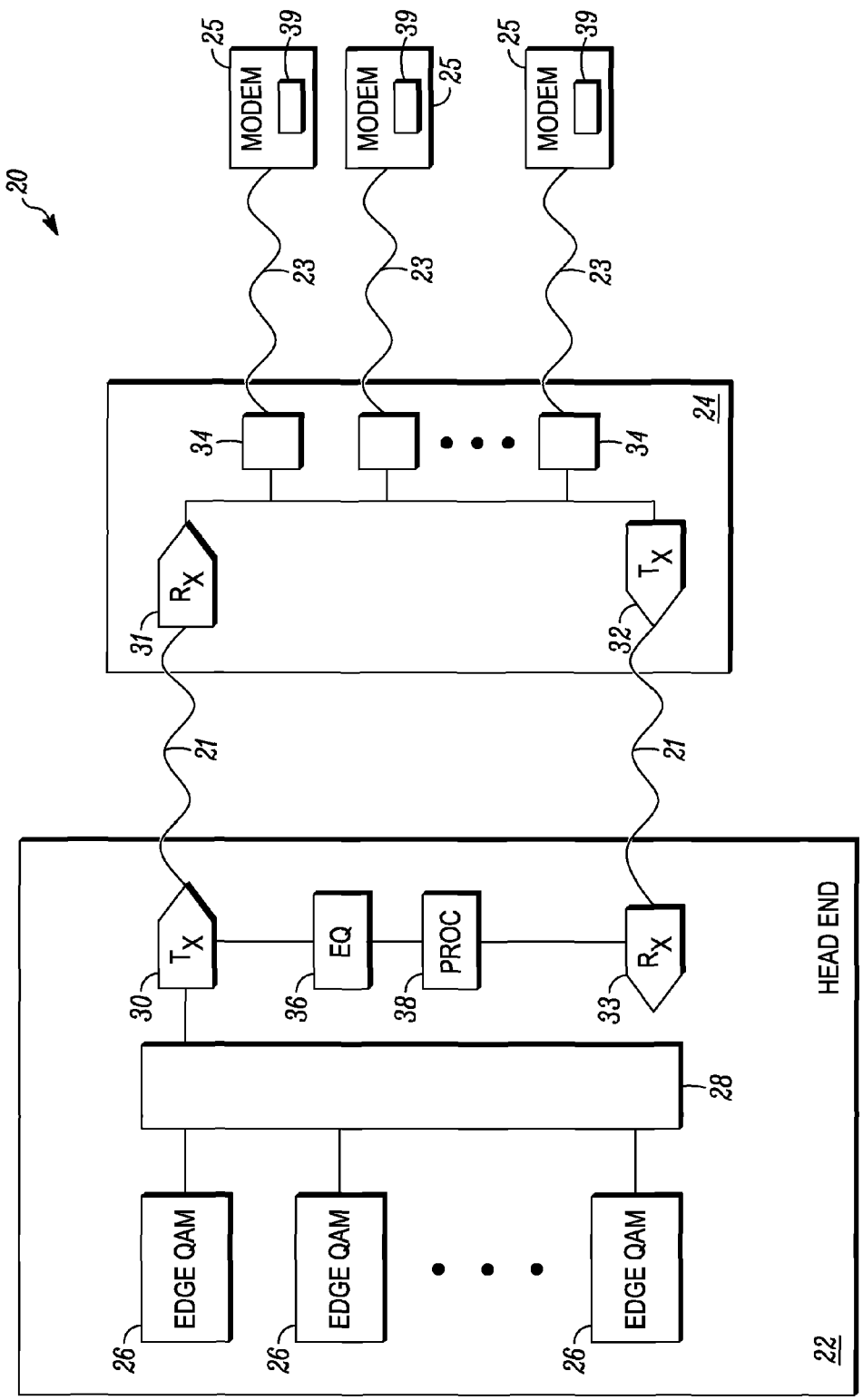
FIG. 4 shows a system capable of mitigating micro-reflections.

FIG. 4 shows an illustrative system 20 capable of detecting and mitigating micro-detected reflections. Without mitigation, the micro-reflection will cause in-band ripples on the signal's frequency response. The system 20 may include a head end 22 connected to one or more cable modems 25 through a node 24 via a network comprising some combination of fiber-optic cables 21 and coaxial cables 23. The head end 22 may include a plurality of EdgeQAM units 26 capable of modulating respective content signals (i.e. video, audio, and data content) to be delivered to customers over a forward path from the head end 22 to the modems 25. The EdgeQAM units 26 output the respective content signals to a RF combining network 28 which may multiplex the signals and propagate the content to the respective cable modems by a transmitter 30, such as a laser transmitter, which transmits a signal to a receiver 31 in the node 24. The node 24 then forwards the demodulated signals to the respective cable modems 25 through diplexers 34. The system 20 is also preferably capable of delivering return path signals from the cable modems 25 to the head end 22 through the node 24 using the node's transmitter 32 and the head end's receiver 33.

As noted previously, the HFC network interconnecting the head end 22 with the modems 25 may include one or more sources of micro-reflections that distort the signals passing through the network. Thus, the system 20 preferably corrects for those micro-reflections in that the head end 22 may receive and measure a signal from one or more of the modems 25 so as to determine coefficients with which to bias, or pre-distort, signals transmitted over the network so that the pre-distortion in the signal cancels the distortion of the network caused by the micro-reflections. For example, one or more modems 25 may transmit an impulse signal to the receiver 33 of the head end 22. The head end 22 may include a processor 38 that measures the amount of distortion between the received signal and an impulse signal to calculate coefficients that a pre-equalizer can use to pre-distort the signal. The coefficients may be transmitted to one or more modems 25, which each have a respective pre-equalizer 39. The respective pre-equalizers 39 of the modems 25 may then pre-distort any subsequent signals sent through the HFC network, based on the coefficients received from the head end 22, such that they arrive at the head end 22 less distorted than they would be without pre-equalization. Alternatively (or additionally), the head end 22 may include its own pre-equalizer 36 with which signals passing between the head end 22 and the modems 25 may be pre-distorted to compensate for microreflections. Techniques for pre-equalization have been disclosed in U.S. Pat.

No. 8,537,972, issued on Sep. 17, 2013 to Thompson et al., the disclosure of which is hereby incorporated by reference.

Figure 5:
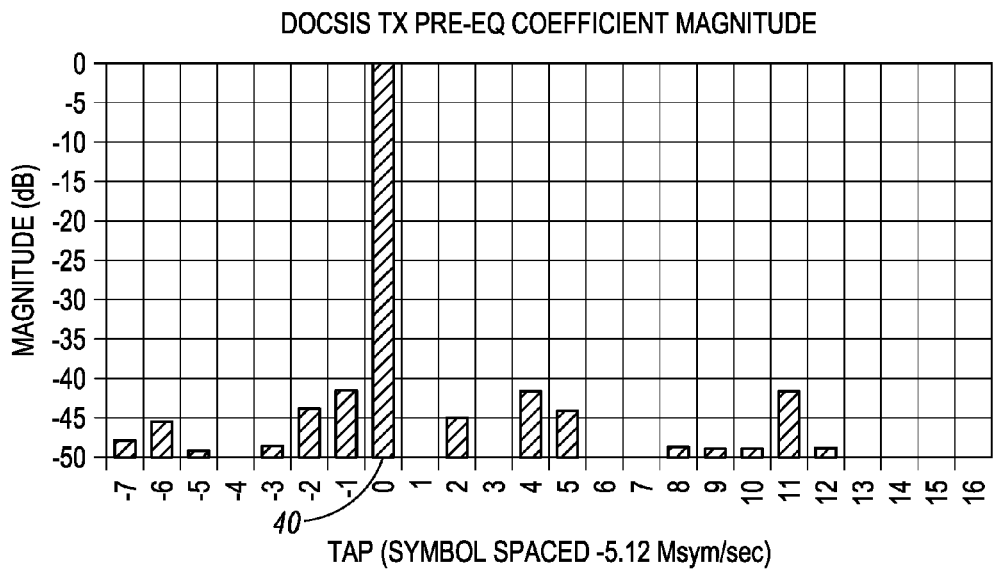
FIG. 5 shows an exemplary impulse response associated with negligible micro-reflection impairment
Figure 6:
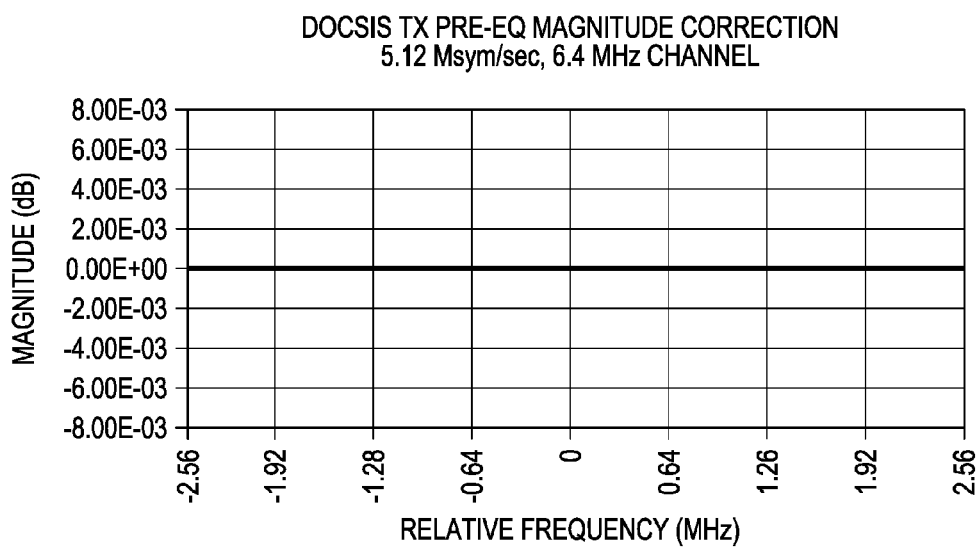
FIG. 6 shows a Fast Fourier Transform (FFT) of the response of FIG. 5.

FIGS. 5-8 show pre-equalization responses where there is, and is not respectively, micro-reflection in the signal received by a CMTS. Specifically, FIG. 5 shows a cable modem transmission impulse response magnitude associated with negligible impairment. In this example, the equalizer's main tap 40 is ideally 0 dB, while the non main taps are appreciably lower. Non main tap values will vary with system noise in the absence of other impairments. For the case in FIG. 5, the system noise is likely between 40-50 dB resulting in the non-main tap values to exhibit what appears to be random values falling within this range. FIG. 6, which shows a Fast Fourier Transform (FFT) of the equalizer coefficients of FIG. 5, reveals that the frequency response magnitude is relatively constant when there is negligible impairment. Thus, when a CMTS receives a signal similar to that of FIGS. 5 and 6, there is not likely to be any micro-reflection impairment.

Figure 7:
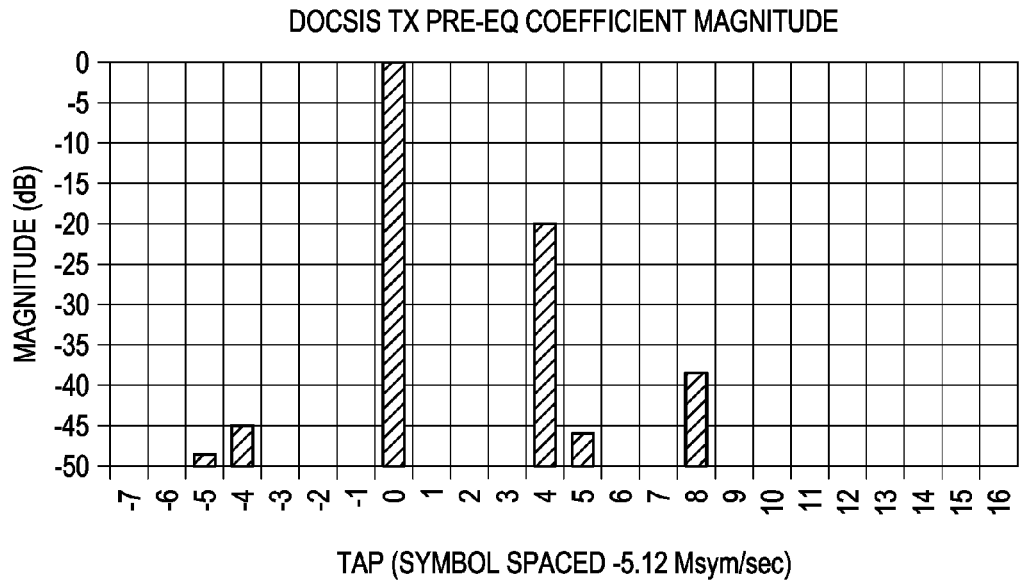
FIG. 7 shows an exemplary impulse response associated with micro-reflection impairment.
Figure 8:
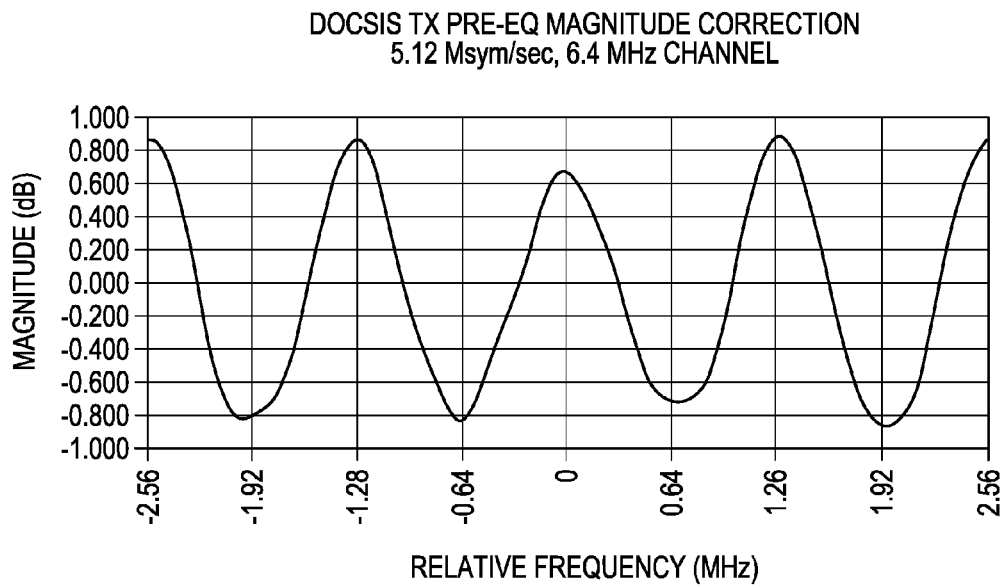
FIG. 8 shows the pre-equalization channel frequency response to micro-reflection impairment.

FIGS. 7 and 8 both illustrate the effect the previously discussed micro-reflection has on both the time and frequency domain magnitude responses. The micro-reflection characteristics, relative amplitude=−20 dBc and delay=4*T can be readily observed from the impulse response of FIG. 7. Because micro-reflections always have a delay characteristic, energy used to cancel micro-reflections will always be within the post-tap region of the pre-equalizer (taps 0 through 16).

Though the system 20 is capable of detecting micro-reflection induced delays in a signal, and mitigating them through a pre-equalization bias, the system 20 does not determine the location of the micro-reflection which is necessary for e.g. repair. Accurately estimating the location of micro-reflections is a common problem in the CATV industry. Though in general terms, micro-reflection delay can be roughly translated into cable distance by the velocity of signal propagation through the transmission system, distances calculated from the delay are not sufficiently accurate to pinpoint the precise location of the impairment, necessitating costly and time-consuming transport and connection of test equipment over a broad area of the HFC network.

The present disclosure presents more effective techniques for determining the location of a micro-reflection impairment from a pre-equalization response. At the outset, equations (1) through (5) generally define the relationship between amplitude ripple and the level of a micro-reflection.

$$\Gamma_E = \frac{Z_E - Z_0}{Z_E + Z_0} \quad (1)$$

$$VSWR = \frac{1 + \Gamma_E}{1 - \Gamma_E} \quad (2)$$

$$\text{Ripple(dB)} = 10\log_{10}(VSWR^2) \quad (3)$$

$$\Gamma_E = \frac{VSWR - 1}{VSWR + 1} \quad (4)$$

$$MicroreflectionLevel(\text{dB}) = 10\log_{10}(\Gamma_E^2) \quad (5)$$

Using the equations provided in [5], one can readily verify that −20 dBc of micro-reflection level equates to approximately 0.87 dB of micro-reflection ripple.

It can also be seen from FIG. 8, that there are four complete waveforms within the channel frequency response resulting from a total micro-reflection delay of four symbol periods or 4*T. Given that the velocity of propagation, VoP, is commonly specified by cable manufacturers, estimates for cable length may be made. For example, modern foam dielectric trunk and feeder cables have a VoP=87%. This equates to 1.17 ns/ft of transit delay. Therefore, the length of cable associated with symbol rate=5.12 Msps, and a micro-reflection delay=4*T will result in a cable length of approximately 334 feet of cable. Because micro-reflection delay is actually round trip delay, the cable length should be based on half of the total micro-reflection delay.

Problems with estimating micro-reflection delay arise when micro-reflection delays are not exactly symbol spaced. For a symbol rate of 5.12 Msps and VoP of 87%, each Pre-Equalizer tap represents approximately 83.5 feet. If one were to rely solely on selecting the Pre-Equalizer tap with the highest energy to represent the micro-reflection delay, cable length estimation error could be as high as ±83.5 feet. This amount of estimation error is unacceptable and could result in mistakenly identifying many suspect cables during the micro-reflection isolation process. A more precise estimate of the cable length associated with a micro-reflection would better enable cable repair technicians to identify suspect lengths of cable contributing to micro-reflection impairment.

One solution proposed by the present disclosure begins by first fitting a sinusoidal waveform against the observed micro-reflection waveform using Cramer-Rao Lower Bound (CRLB) for Sinusoidal Parameter Estimation technique:

$$x[n] = A\cos(2\pi f_0 n + \phi) + w[n]$$

$$n = 0, 1, \ldots, N-1 \quad (6)$$

Estimation of all three sinusoidal parameters; frequency, amplitude and phase will be required.

The variation associated with amplitude, frequency, and phase relative to the CRLB will provide valuable insight to estimation performance. Additionally, variance assessment will also aid in guiding appropriate values for N and SNR, for which micro-reflection estimations may be made efficiently and accurately. The value for examining estimation variance as a function of N is significant since increasing N could appreciably add to required estimation processing and ultimately cost.

Figure 10:
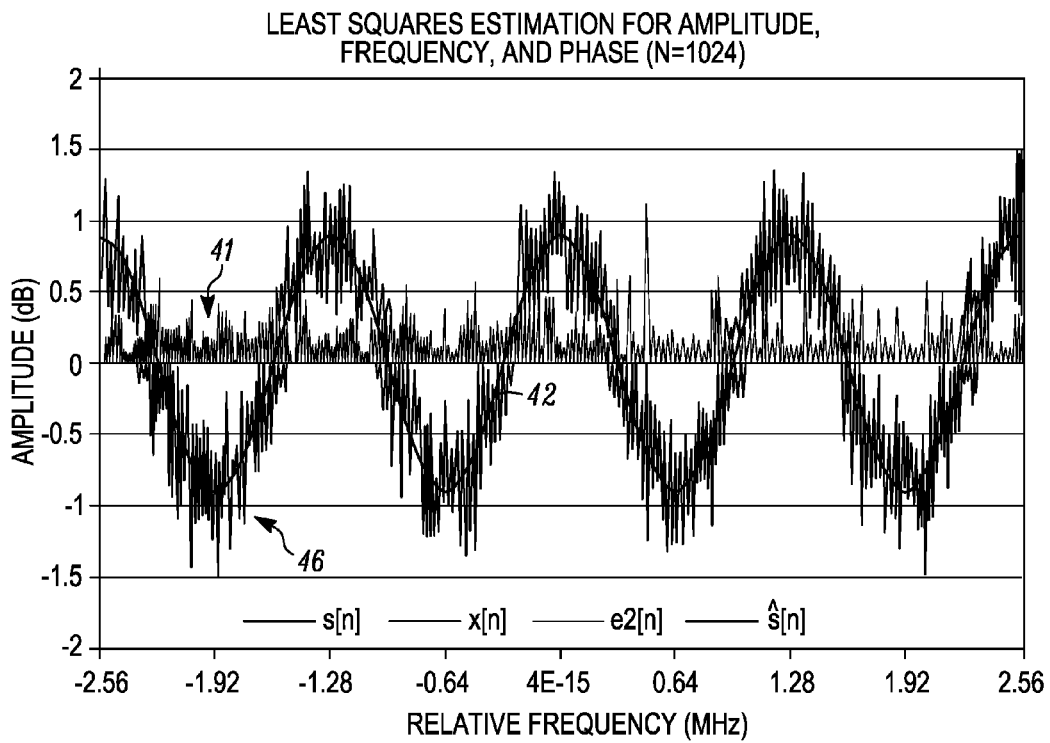
FIG. 10 shows a second estimated sinusoidal micro-reflection waveform.
Figure 11:
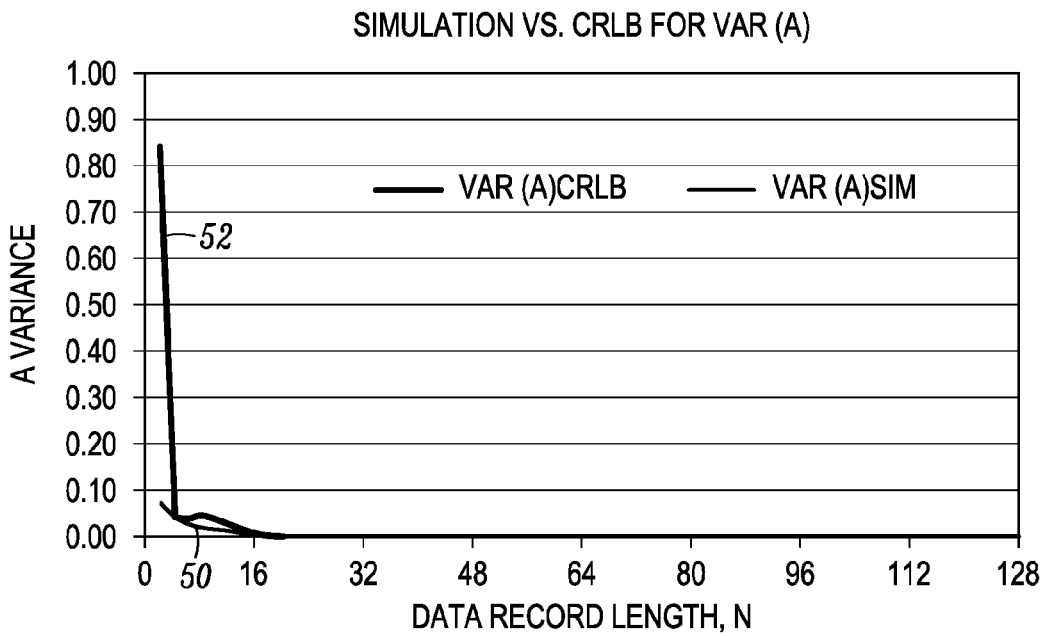
FIGS. 11-13 each show simulation results for variance of a respective variable in an estimated sinusoidal micro-reflection impairment as a function of data records.

For an initial evaluation, the waveforms were tabulated using Microsoft Excel. N=64, and 1024 are illustrated in FIGS. 10, and 11 respectively where FIG. 10 assumed that N in equation (6) is 64 while FIG. 11 assumed that N was 1024. Variance, $\sigma^2$, was calculated using Equation 7, with SNR=10 dB.

$$SNR = \eta = \frac{A^2}{2\sigma^2} \quad (7)$$

The signal parameters used were as previously described, A=0.87 dB, $f_0$=4 Hz, and $\phi=\pi/2$ radians. The Microsoft Excel add-in "Solver" was used to minimize error between the observed signal s[n] 42 embedded in noise x[n] 44, and a signal guess ŝ[n] 46 that closely followed the signal s[n] 42, varying amplitude, frequency and phase simultaneously. Microsoft Excel add-in "solver" would not estimate the true parameter value reliably unless the initial conditions were already at values close to the true parameters.

Figure 9:
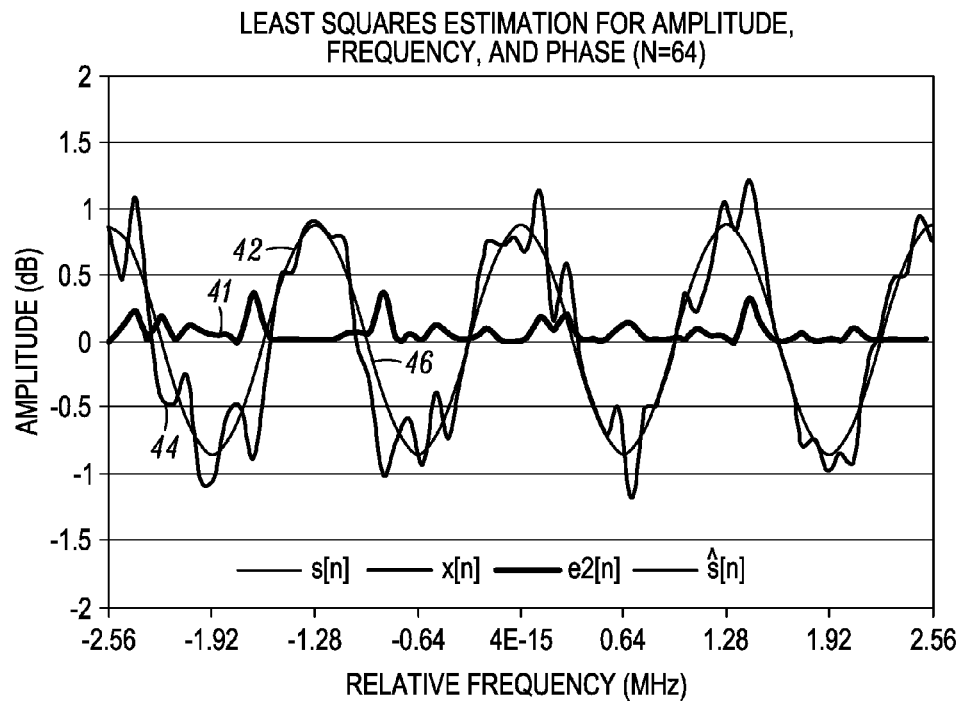
FIG. 9 shows a first estimated sinusoidal micro-reflection waveform.

The waveform 41 in FIGS. 9 and 10 represents the square error, based upon the Least Squares Error Criterion from Equation 8.

$$J(\vartheta) = \sum_{n=0}^{N-1} (x[n] - s[n])^2 \quad (8)$$

Comparing FIGS. 9 and 10, there is appreciable difference between the square error. N=64 square error had values that ranged 4-6, while N=1024 square error ranged between 64-96. This makes sense since the N=1024 signal has 16 times as many points as the N=64 signal and each point for both cases has the same variation due to noise.

A Matlab model was also used in a similar fashion to what has been illustrated using Microsoft Excel. The waveform s[n] was generated using Equation 6 and the true parameters originally specified. The waveform w[n] was generated via specified SNR, amplitude, A, and variance, $\sigma^2$, using Equation 7. A key difference between the two models, however, was the way in which the guesses were generated. Microsoft Excel offered no control over how amplitude, frequency, and phase were varied. However, within Matlab, the three parameters were part of a nested "for" loop series sweeping over the following specified ranges.

A=0:0.1:5.0
$f_0$=0:0.01:16
φ=0:π/4:2 π

Each loop creates an estimate, g[n], using the above parameters to compare to the observed signal x[n] for Least Squares, LS, error as described in Equation 8. Amplitude ripple scenarios were limited between 0 and 5 dB. As previously discussed 5 dB of micro-reflection ripple equates to approximately −11 dBc relative to the main tap energy. This magnitude micro-reflection is not a common occurrence in today's CATV networks, but certainly a condition in which the equalizer could correct for. A more complete range for A could be 0 to 15 dB of ripple or −3 dBc level, beyond which any higher energy in the equalizer tap would likely result in equalizer instability and failure.

The frequency range was limited to 16 Hz. Because the frequency within the digital signal channel response is directly related to the micro-reflection delay path, frequency (and subsequently delay) resolution of $1/100^{th}$ of a Hz was chosen to achieve estimation of suspect cable lengths to within ±0.835 ft accuracy. It was previously noted that whole frequency, or delay accuracy equated to approximately ±83.5 ft accuracy in cable length, assuming $R_s$=5.12 Msps and VoP=87%. Further, $1/10^{th}$ tap accuracy improves cable length estimation accuracy to ±8.35 ft; and finally, ±0.835 ft accuracy with $1/100^{th}$ tap. Of course, as the $R_s$ and VoP value change, so will the accuracy of the micro-reflection cable length estimator. For example, reducing to $R_s$=2.56 Msps, degrades the accuracy of the model to ±1.67 ft, assuming all other aspects of the estimator remain equal. Finally, the range and resolution selection for phase preferably ensures optimal estimation of frequency.

Once all of the loops have been executed, the set of parameters that result in minimal LS error, J(Θ), is chosen as the estimated signal, ŝ[n], representing estimates for amplitude, frequency, and phase.

CRLB assessment as a function of N was facilitated using Monte Carlo simulations in Matlab, where the number of Monte Carlo runs M per value of N, was 100. 10 different N values were evaluated each being a power 2, i.e. N=[2, 4, 8, . . . , 1024]. CRLB for each parameter is represented in equations 9 through 11, for amplitude, frequency, and phase.

$$\text{var}(\hat{A}) \geq \left(\frac{2\sigma^2}{N}\right) \quad (9)$$

$$\text{var}(\hat{f}_0) \geq \left(\frac{12}{(2\pi)^2 \eta N(N^2-1)}\right) \quad (10)$$

$$\text{var}(\hat{\phi}) \geq \frac{2(2N-1)}{\eta N(N+1)} \quad (11)$$

Figure 12:
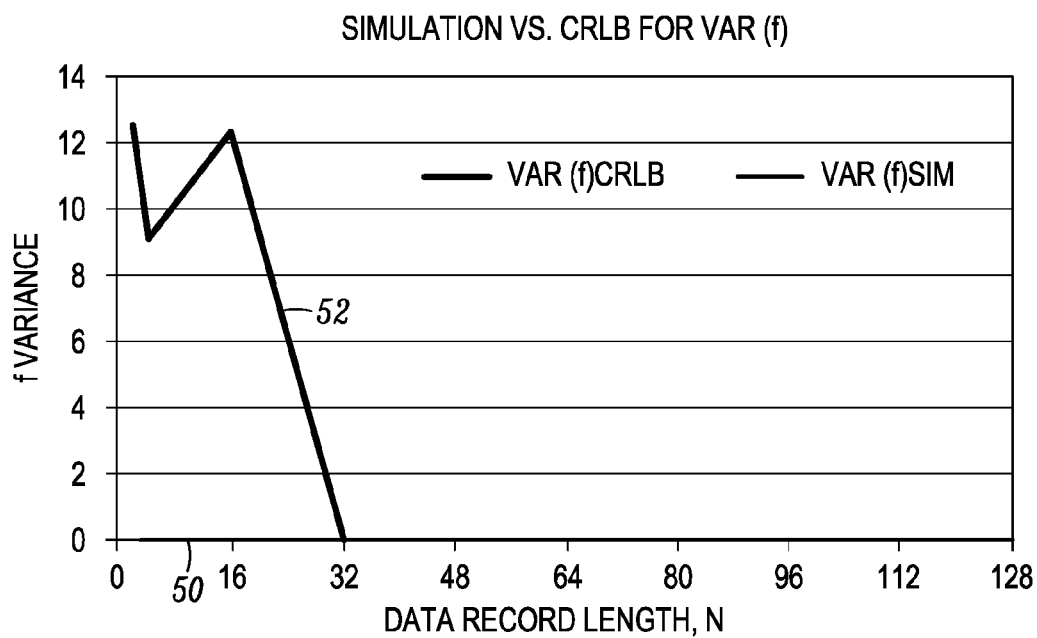
Figure 13:
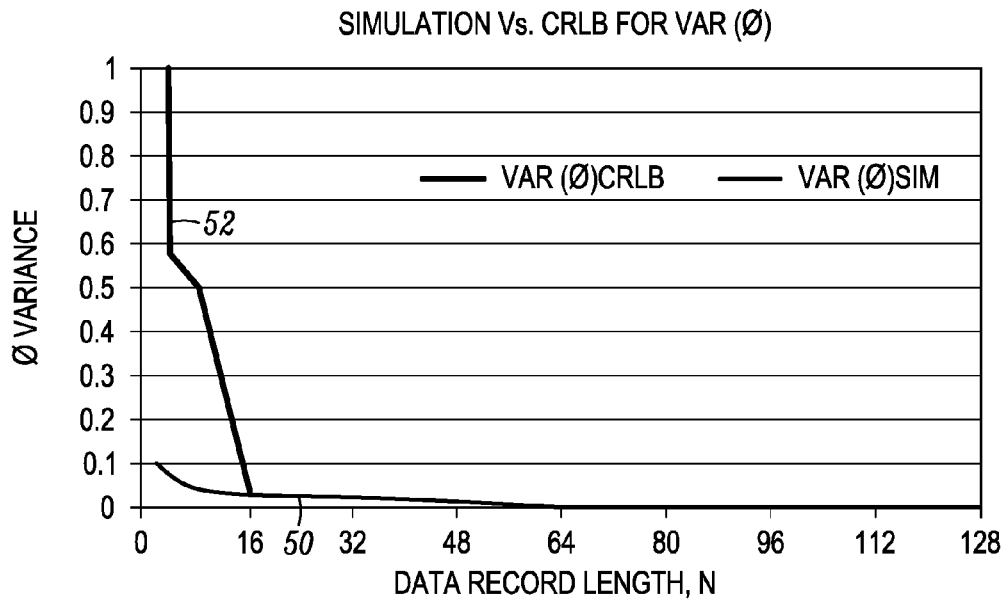

Simulation results are presented in FIGS. 11 through 13, where the curve 50 represents the CRLB from equations 9 through 11 and the curve 52 represents variance of M=100 Monte Carlo simulations. These figures show how the estimator variance improves as N increases. For N>32, estimator variance improves substantially. Many simulations will be used to evaluate estimation performance against SNR, therefore N=64 will be selected. With N=64, some estimator performance will be lost through increased variation, but is something worth tolerating in order to achieve results within a reasonable time frame.

Figure 14:
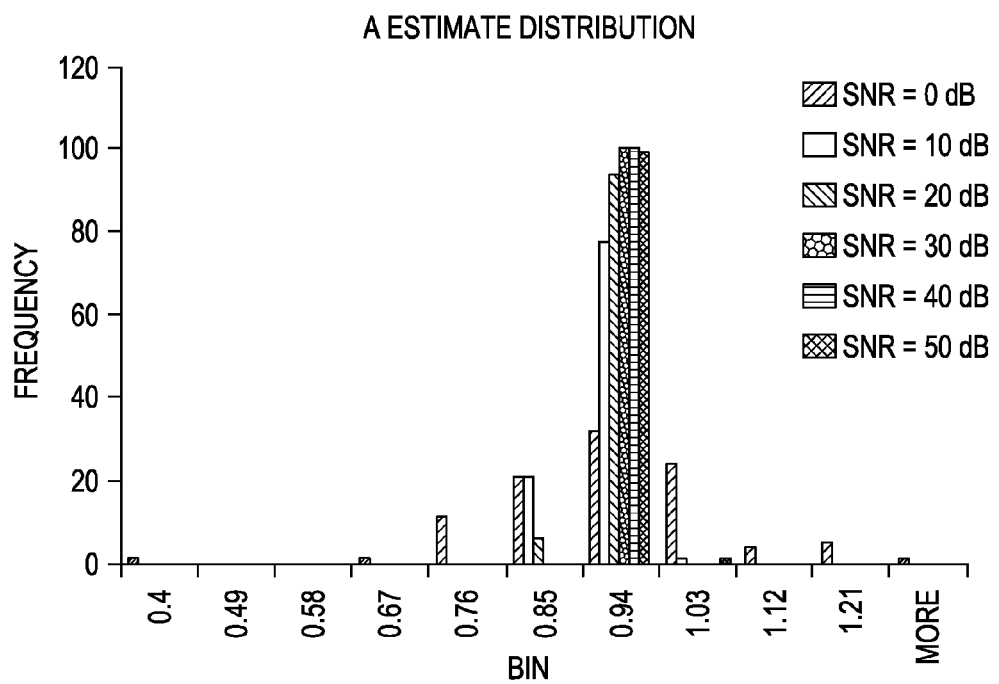
FIGS. 14-17 each show simulation results for variance of a respective variable in an estimated sinusoidal micro-reflection impairment as a function of SNR.
Figure 15:
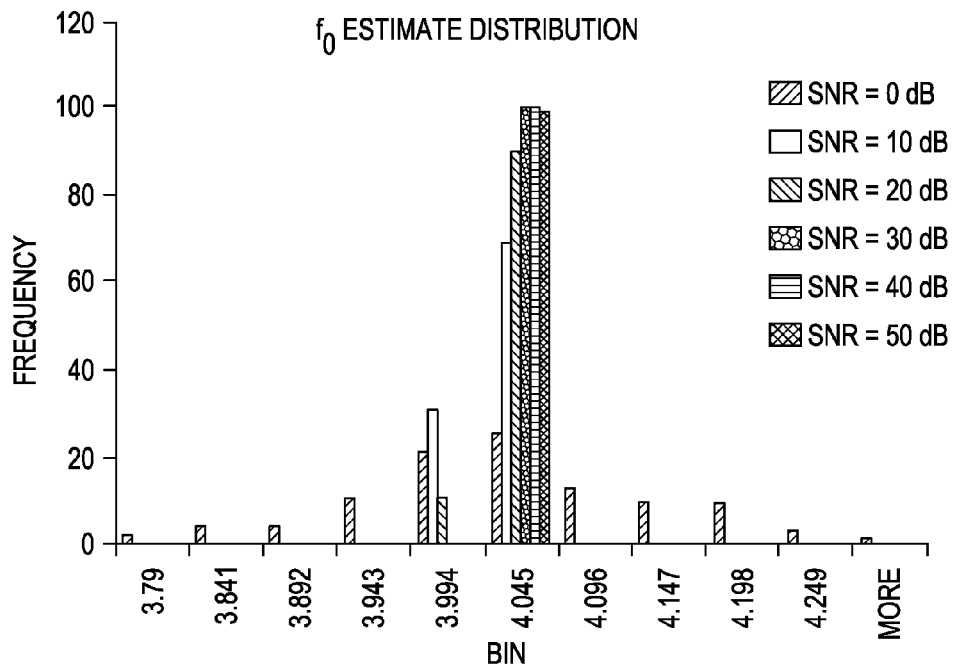
Figure 16:
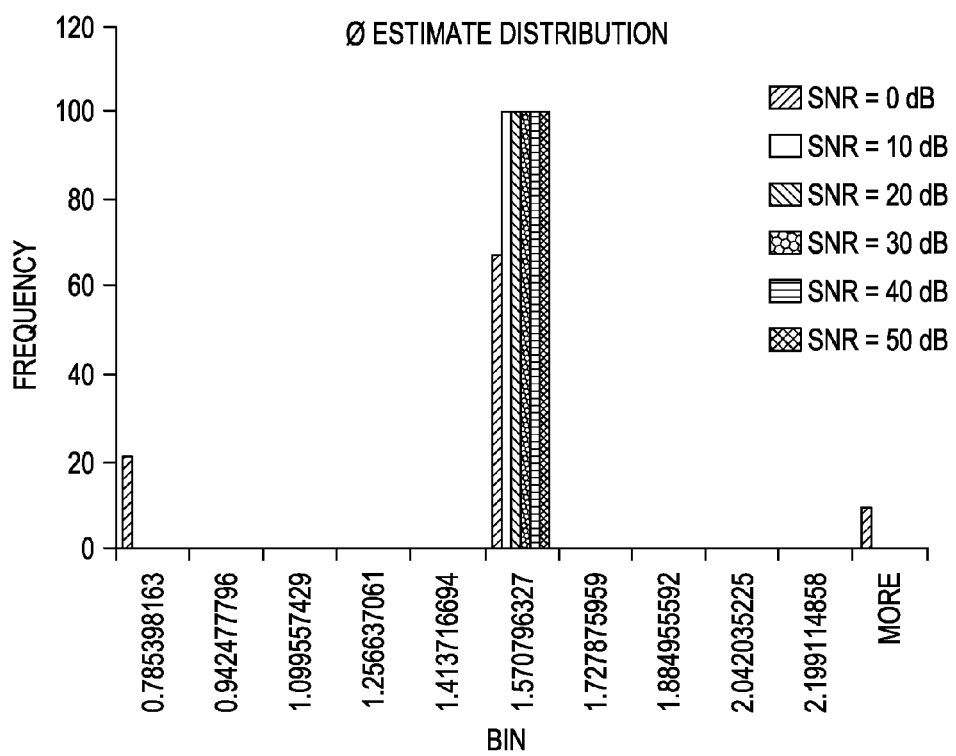

Simulation distribution for each parameter estimate as a function of SNR is illustrated in FIGS. 14 through 16, where the SNR values are specified in the legend. The effect of improving SNR can readily be seen for the amplitude and frequency estimates.

The phase distributions do not have the same resolution as amplitude and frequency, and may be the likely cause of why the observed effect of SNR does not gradually change from one SNR value to the other like it does for amplitude and frequency. Additionally, there appears to be a value of SNR in which the phase estimation exhibits a cliff effect, where appreciably worse estimation occurs over a shorter range of SNR. This SNR value is likely between 0 and 10 dB.

Figure 17:
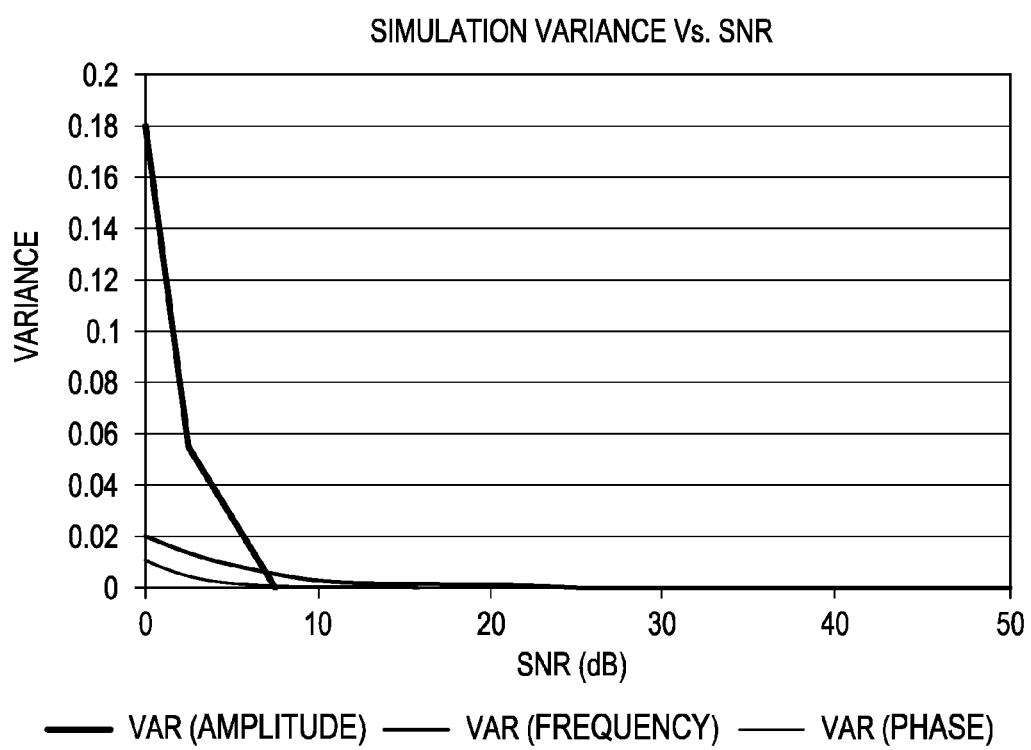

FIG. 17 shows that overall, the variance associated with estimating amplitude, frequency, and phase improves appreciably with SNR>10 dB. This is beneficial since most CATV upstream systems are designed and maintained to support 16-QAM signaling, which requires SNR≥22 dB for gray encoded BER=1E-8 [7] a typical operating range for most cable system operators.

Table 1 includes results where each SNR entry is based upon M=100 Monte Carlo simulations. Estimation of frequency, the key parameter for estimating cable lengths associated with micro-reflections, converges with SNR as low as 5 dB. Amplitude exhibits 0.03 dB of error because the resolution of the estimator is 0.1 dB. This error could be eliminated with increased resolution at the expense of estimation processing requirements. However, 0.01 dB of amplitude ripple equates to a relative micro-reflection level of −64.80 dBc, which is of little consequence since differences this small would likely be buried well below the effects of system noise.

TABLE 1

| ESTIMATED MEAN FOR M = 100 MONTE CARLO SIMULATIONS | | | |
|---|---|---|---|
| SNR | Amplitude | Frequency | Phase |
| 0.00 | 0.90 | 4.02 | 1.47 |
| 2.50 | 0.88 | 4.01 | 1.55 |
| 5.00 | 0.88 | 4.00 | 1.59 |
| 7.50 | 0.87 | 4.00 | 1.57 |
| 10.00 | 0.87 | 4.00 | 1.57 |
| 12.50 | 0.88 | 4.00 | 1.57 |

TABLE 1-continued

ESTIMATED MEAN FOR M = 100 MONTE CARLO SIMULATIONS

| SNR | Amplitude | Frequency | Phase |
|---|---|---|---|
| 15.00 | 0.87 | 4.00 | 1.57 |
| 17.50 | 0.89 | 4.00 | 1.57 |
| 20.00 | 0.89 | 4.00 | 1.57 |
| 22.50 | 0.89 | 4.00 | 1.57 |
| 25.00 | 0.90 | 4.00 | 1.57 |
| 27.50 | 0.90 | 4.00 | 1.57 |
| 30.00 | 0.90 | 4.00 | 1.57 |
| 32.50 | 0.90 | 4.00 | 1.57 |
| 35.00 | 0.90 | 4.00 | 1.57 |
| 37.50 | 0.90 | 4.00 | 1.57 |
| 40.00 | 0.90 | 4.00 | 1.57 |
| 42.50 | 0.90 | 4.00 | 1.57 |
| 45.00 | 0.90 | 4.00 | 1.57 |
| 47.50 | 0.90 | 4.00 | 1.57 |
| 50.00 | 0.90 | 4.00 | 1.57 |

The foregoing estimation technique is performed in the frequency domain, utilizing a least square error approach for estimating a delay due to a micro-reflection, however the disclosure is not limited to this approach. In some instances, for example, it may be preferable to use a time-based approach that directly analyzes a pre-equalizer's converged set of coefficients, and applies a modification to those coefficients to better estimate the micro-reflection delay.

A signal Y[n] received over a HFC network having one or more micro-reflections may be modeled in a discrete-time domain as the sum of the transmitted signal X[n] and one or more attenuated copies, with respective delays, as described in equation 12.

$$Y[n] = X[n] + \alpha_1 X[n-1] + \alpha_2 X[n-2] + \ldots \alpha_m X[n-m] \quad (12)$$

The respective micro-reflections may result from several distinct faults in the transmission path, causing what is called a multiple recursion echo, or may result from a single fault in the transmission network traveling along one of several paths to the destination, which is called a single recursion echo. Regardless of the type of echo, a properly designed pre-equalization system can compensate for either type, by using a multiple-tap pre-equalizer to approximate an inverse response to the distortion produced by the combination of echoes. If the echoes are weak, the first recursion echo is the only significant echo in either the single or multiple recursion case, and the first tap of the pre-equalizer will compensate for most of the distortion. However, even in unique echo cases like the single-transit echo, the multiple taps in the pre-equalizer can be used to adapt to the echo, a transfer function describing a CATV network communication channel A(z) will be comprised of many delay elements.

Assuming that X[n] of equation 12 is an impulse function, Equation 13 is z-domain representation A(z) of the signal Y[n].

$$A(z) = 1 + \alpha_1 z^{-1} + \alpha_2 z^{-2} + \ldots \alpha_m z^{-m} \quad (13)$$

An Finite Impulse Response (FIR) filter or equalizer implementation will be an approximation of the micro-reflection impairment with a response B(z), whose characteristics ideally match the inverse of the micro-reflection or channel's response A(z) so that when the signal passes through this filter, the effects of the micro-reflection is cancelled and the net response becomes ideally 1 as illustrated in Equation 14 and 15

$$B(z) \approx A(z)^{-1} \quad (14)$$

$$Y(z) = A(z)B(z)X(z) \quad (15)$$

where A(z)B(z) is equal to 1 and X(z) is an impulse in the Z-domain.

Figure 18:
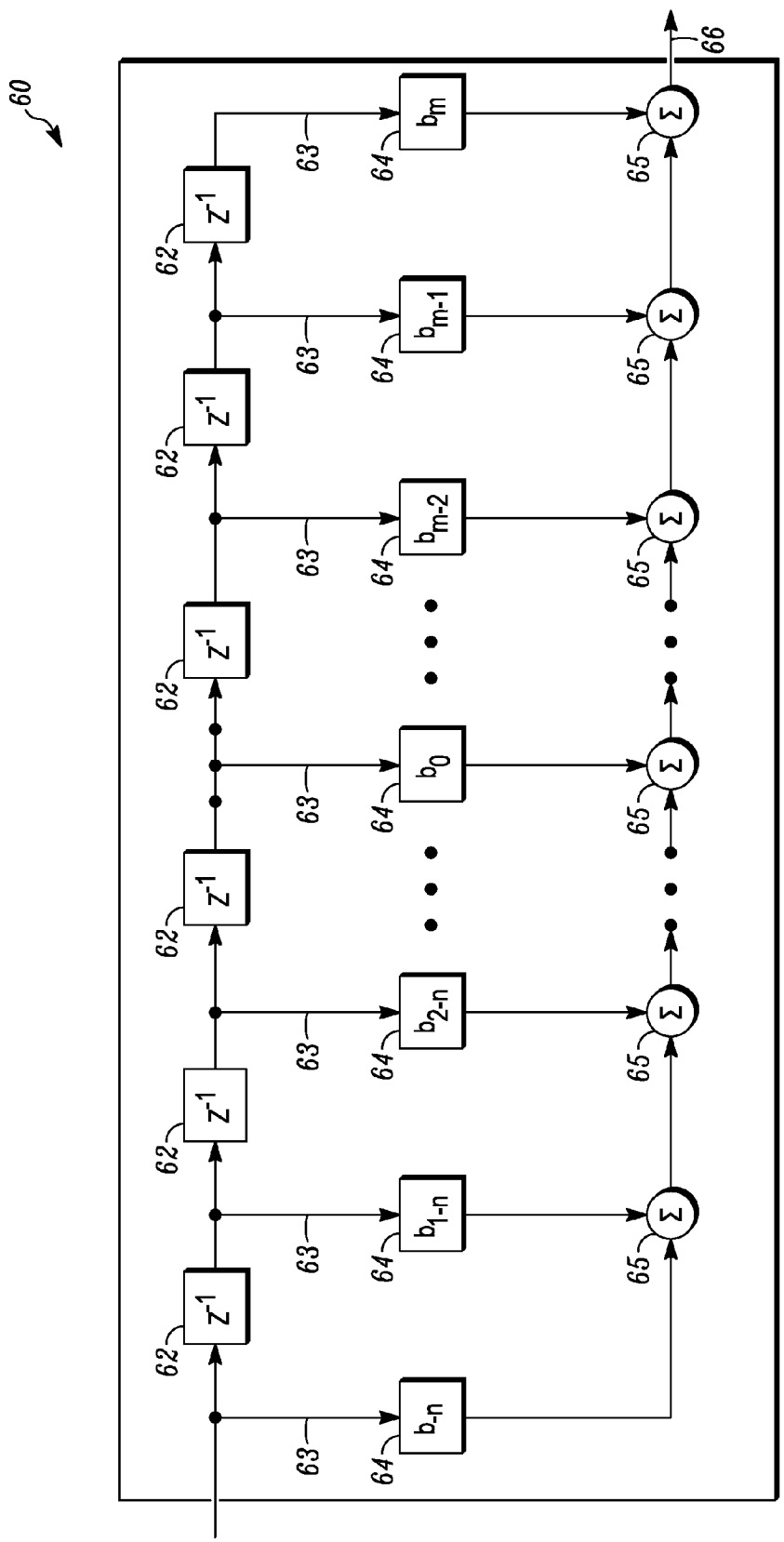
FIG. 18 shows an example of a pre-equalizer capable of modifying a signal to compensate for micro-reflections.

In the time domain, the delay associated with a micro-reflection may preferably be based on an pre-equalizer's z-domain impulse response B(z), having an associated time-domain impulse response b[n]. For example, FIG. 18 schematically shows a pre-equalizer 60 having delay elements 62 after respective taps 63, each tap weighted by weights 64 which correspond to respective pre-equalization coefficients. The respectively delayed taps are summed by elements to produce a time-domain response 66. The pre-equalizer of FIG. 18 has a number of taps equal to n+m, where n is the number of taps before the main tap $b_0$, and m is the number of taps after the main tap $b_0$. It should be understood by those skilled in the art that n and m may be varied as desired, depending on how many delay elements are desired before the main tap, and how many delay elements are desired after the main tap.

In some embodiments, a pre-equalizer may be implemented using an AGILENT MXA Series N9020A Vector Signal Analyzer (VSA) configured in DEMODULATION Mode of Operation with the Equalizer Function enabled, and operated using the AGILENT 89600 VSA software. In such a configuration, the AGILENT VSA may implement a pre-equalizer having a desired number of taps (up to 99). For instance, the AGILENT VSA may implement a 39-tap equalizer having a main tap at tap 16, and in such a configuration the equalizer may conveniently be truncated to a 24-tap equalizer by simply using the 7 taps prior to the main tap and the 16 taps following the main tap. Alternatively, the pre-equalizer may have any other desired number of taps and/or any other desired split of taps before and after the main tap. Each of the delays and weights may be varied to produce a pre-equalization signal calculated to counteract a detected delay from a micro-reflection. Thus, when a signal from a cable modem or other device encounters micro-reflections within their transmission path to the CMTS, the pre-equalizer 60 may be used to mitigate the micro-reflection impairment by biasing the device's transmit signal with a micro-reflection of equal amplitude and opposite phase, such that when the CMTS receives the digital signal, the effects of the in-channel micro-reflection impairment have been cancelled by the signal bias.

Typically complex coefficients are provided when cable modems are queried for their pre-equalization information. Complex coefficients for a 39-tap equalizer, with a main tap at tap 16, have been provided below in order to illustrate the disclosed method of estimating a micro-reflection delay in the time domain.

$Coeff_{b(n)} = [-0.00003665078 - 0.000003529535\, i0.0009227422 -$ $0.000011550291\, i - 0.0001179332 - 0.000007865431\, i0.0002172839 -$ $0.00004264679\, i - 0.0002135056 - 0.00002098886\, i0.0008742874 -$ $0.00007301251\, i0.0004928805 + 0.00003648677\, i -$ $0.0006369746 - 0.0003050625\, i0.0008179067 + 0.00009856719\, i -$ $0.0005863899 - 0.00004911557\, i - 0.0002600013 -$ $0.0001598964\, i0.002785664 + 0.000340097\, i - 0.0055957 -$ $0.0009939339\, i0.0099139 + 0.001181552\, i\ -0.02338727 -$ $0.0008406944\, i0.9633182 + 0.03132404\, i0.05263075 -$ -continued $$0.04412857 i 0.1712351 - 0.1531988 i - 0.01670809 -$$
$$0.009586891 i 0.01254876 - 0.06168799 i - 0.009968993 +$$
$$0.009517347 i - 0.005665266 - 0.01805476 i - 0.000592167 +$$
$$0.007689914 i - 0.004138622 - 0.004871534 i 0.001518812 +$$
$$0.003134432 i - 0.0008844165 - 0.0010891 i 0.000935742 +$$
$$0.0006900355 i - 0.0005186404 - 0.00026160 21 i 0.0003381264 +$$
$$0.00000327865 i - 0.0001684702 + 0.000040 50884 i 0.000009928597 -$$
$$0.00009819612 i 0.000002819018 + 0.00005 03193 i 0.000007896499 -$$
$$0.000002379687 i - 0.000007724707 - 0.00003078196 i -$$
$$0.000000560761 + 0.00005834876 i 0.000003711197 -$$
$$0.00000142774 i 0.00002063833 + 0.000004 932875 i 0.00003454319 -$$
$$0.00001452121 i - 0.00002156384 - 0.000002776993 i$$

These coefficients are those for an equalizer impulse response, b[n], which includes a micro-reflection at a delay that is approximately two times the symbol period, $T_s$. The symbol period is the inverse of the symbol rate $R_s$. A common DOCSIS symbol rate is $R_s$=5.12 Msps, therefore the symbol period $T_s$=195.3 ns. Since this is a T-spaced equalizer implementation, the delay associated with each tap is 195.3 ns. Therefore, the delay associated with the micro-reflection is 390.6 ns.

Figure 19:
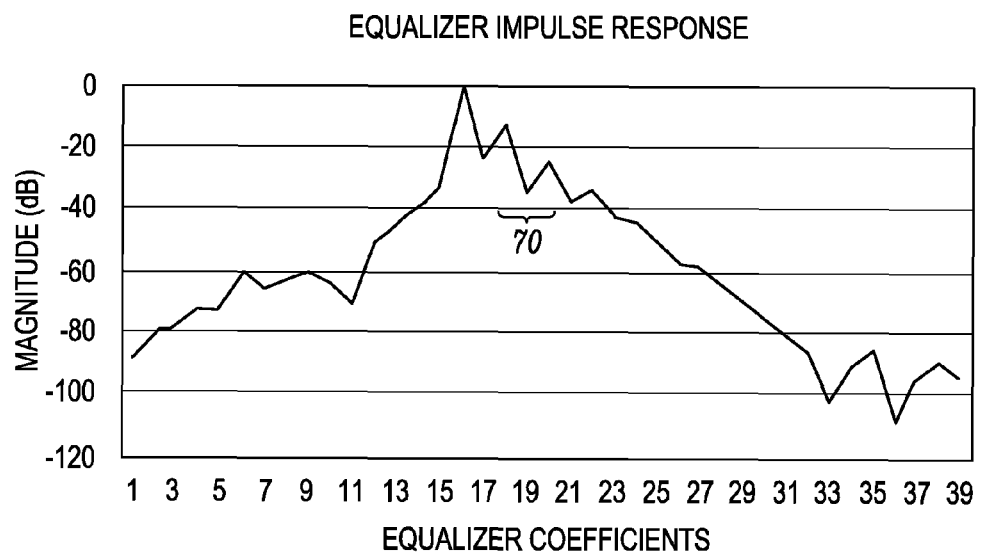
FIG. 19 shows a response of the pre-equalizer of FIG. 18 to an impulse signal.

FIG. 19 plots the magnitude of the impulse response $h_{eq}$ and reveals that there is an echo or spike 70 beginning at approximately tap 18, two symbol periods later from the main tap 16. Based on existing techniques of estimating micro-reflection delay, one could estimate the cable length to be approximately 167 ft. of coaxial cable, but the present disclosure uses digital signal processing (DSP) in the time domain to improve the accuracy of the cable length estimate.

Figure 20:
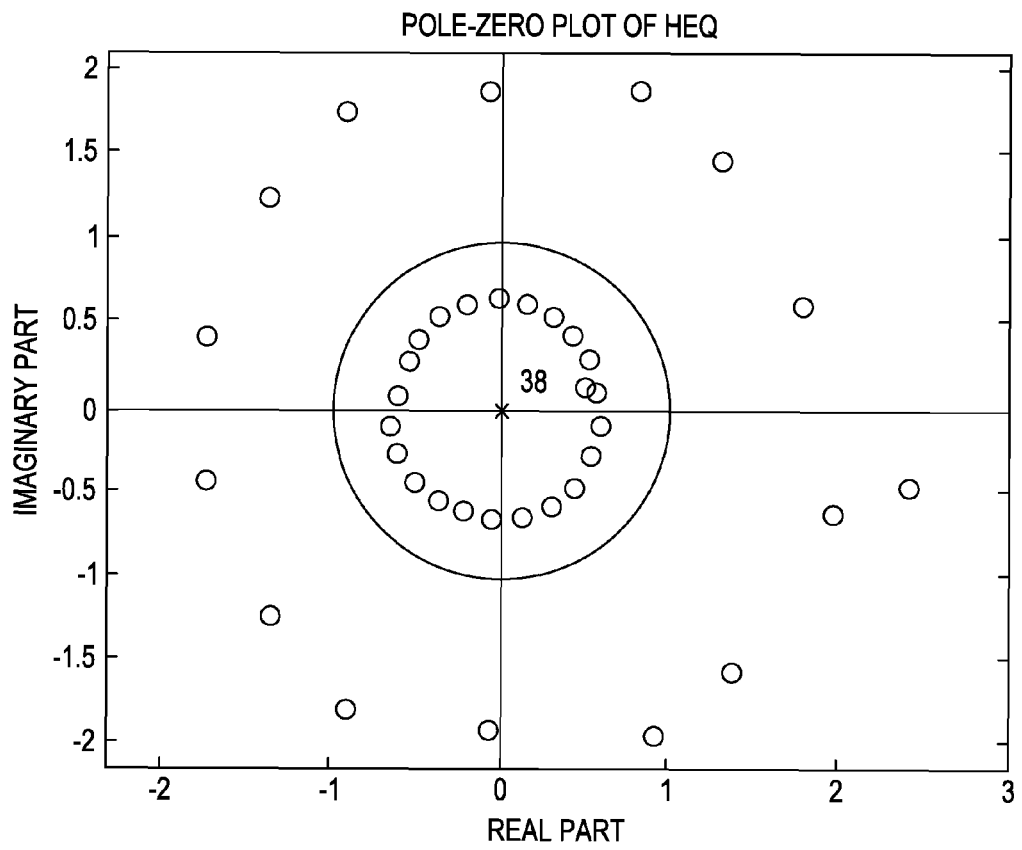
FIG. 20 shows a pole-zero plot of an exemplary response of a pre-equalizer.

First, the channel response A(z) may be estimated by receiving the coefficients from pre-equalizer 60 to form a time domain response 66, as illustrated in FIG. 18, that may be converted to the z-domain and inverted using equation 14. However, as illustrated by the z-plane plot illustration in FIG. 20, of the coefficients of b[n] may produce a transfer function B(z) having many zeroes falling outside the unit circle, which makes inverting $h_{eq}$ problematical. In such a circumstance, calculating a minimum phase version of b[n] using Equation 6, the MATLAB ploystab( ) function, will produce a z-domain response more suitable for inversion, but yet still retain the characteristics of the channel.

$$h_{min} = \text{polystab}(h\_eq) * \text{norm}(h\_eq)/\text{norm}(\text{polystab}(h\_eq)) \quad (6)$$

Figure 21:
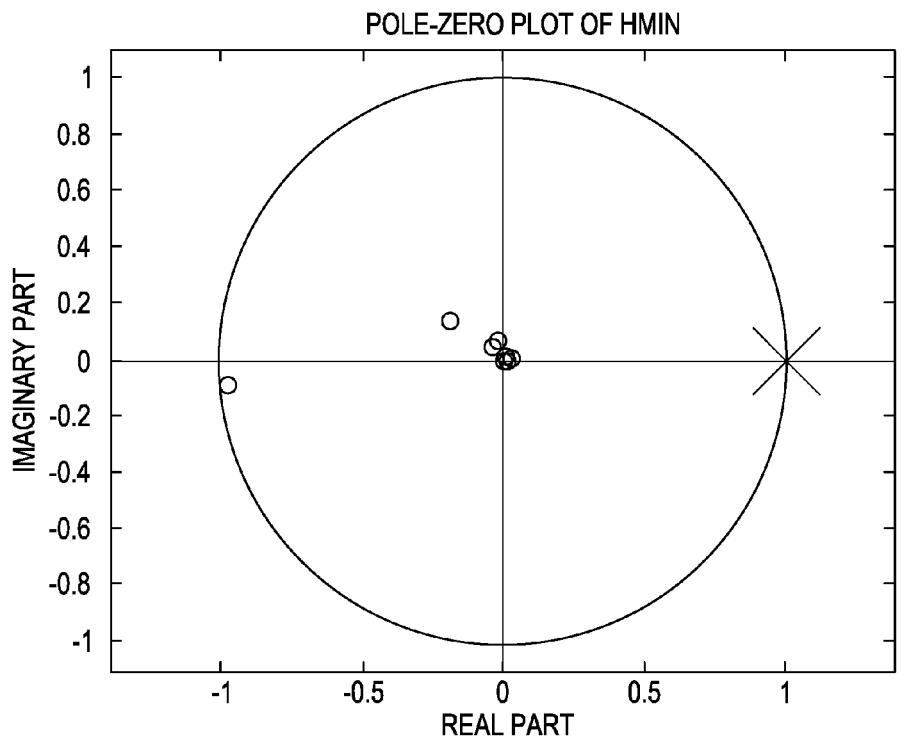
FIG. 21 shows a pole-zero plot of a modified response of FIG. 20.

The minimum phase (MP) filter, $h_{min}$, illustrated in FIG. 21 now has all the zeros located within the unit circle, thus invertible.

Figure 22:
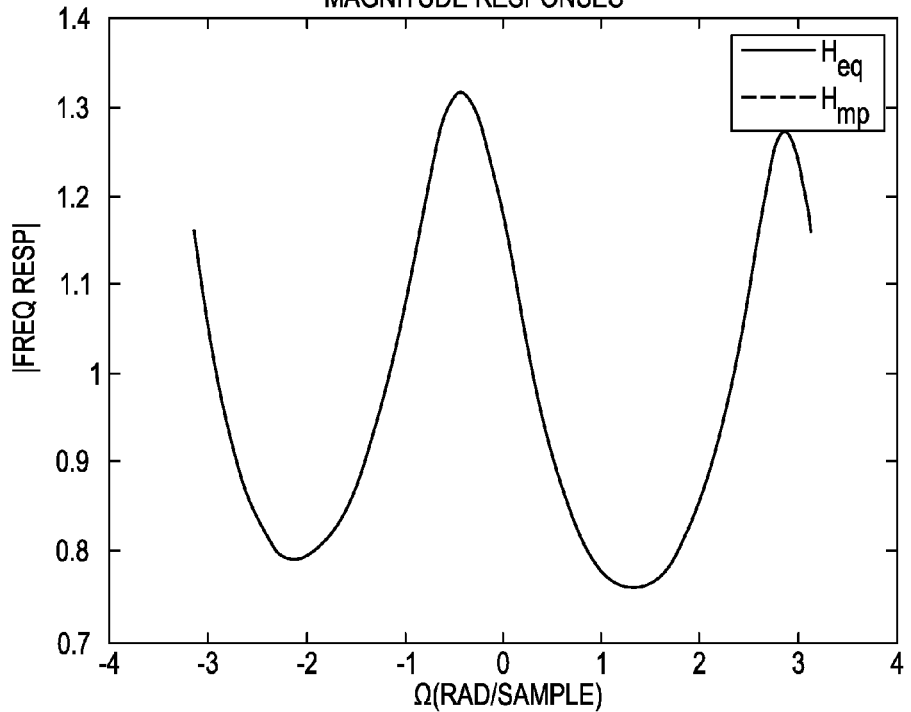
FIG. 22 shows the frequency response of an inverted impulse response of a pre-equalizer.

A comparison of the magnitude of the frequency responses of b[n] and $h_{min}$ show that they are substantially identical, as seen in FIG. 22, confirming that $h_{min}$ may be used as a substitute for b[n]. Note that the coefficients of both b[n] and $h_{min}$ are a time domain representation of the equalizing filter and the channel respectively. The frequency domain responses may be obtained by performing the Discrete Fourier Transform (DFT) on the time domain responses (possible using zero-padding), which is illustrated in FIG. 22. The frequency response is just as revealing at the time domain. The in-band ripple amplitude will be proportional the micro-reflection level. The number of complete waveforms is proportional to the delay, which in this case there are approximately two. Note to convert a frequency domain response back to the time domain, the Inverse Discrete Fourier Transform (IDFT) would be used.

Figure 23:
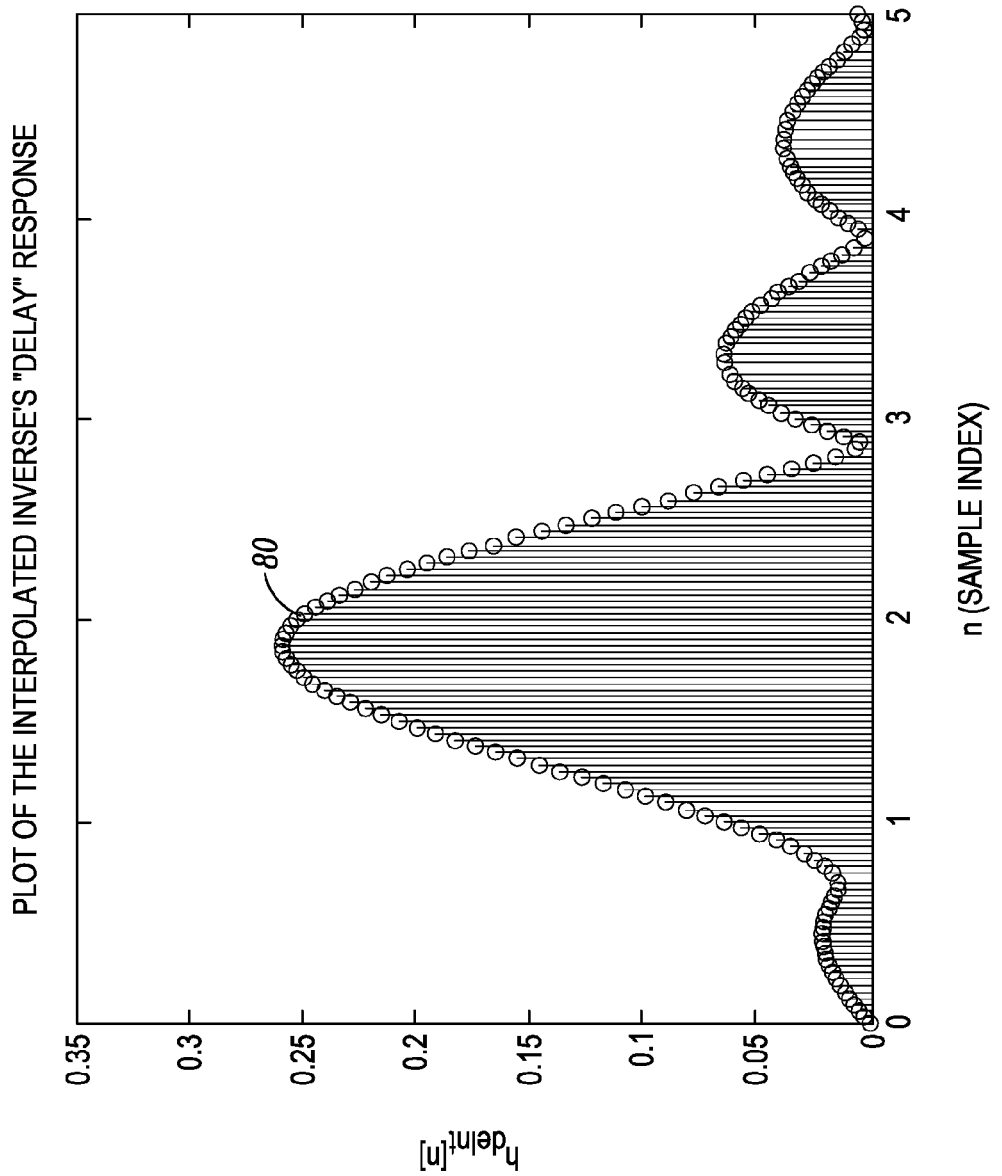
FIG. 23 shows an interpolation technique to improve an estimate of micro-reflection delay.

Given the magnitude responses are equivalent, $h_{min}$ can be inverted to obtain the channel response A(z) and converted to the time domain [in tap samples n] as described above. To improve the resolution, interpolation is used to increase the samples between the taps, in this case by a factor of 32, illustrated in FIG. 23. It can be observed from this figure that the peak 80 associated with the micro-reflection does not occur precisely at 2, in fact the peak is approximately 5/32T less than 2T. Translating this to cable length means that the estimated cable length is 151.3 ft. instead of 167.0 ft. predicted earlier.

Figure 24:
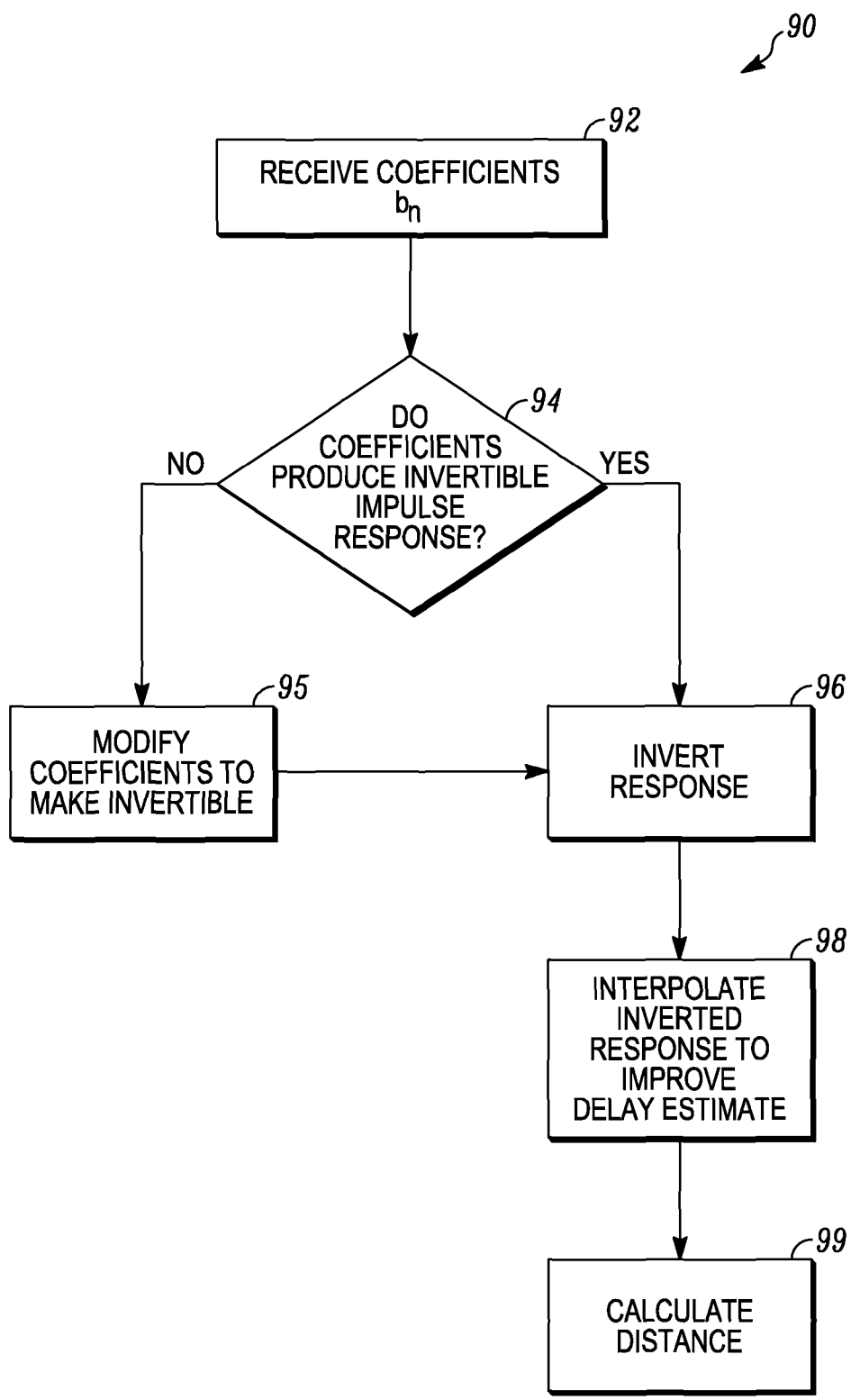
FIG. 24 shows a time-domain method of calculating the distance to a micro-reflection impairment based on the coefficients of a pre-equalizer.

FIG. 24 generalizes the procedure just described. Specifically, a method 90 for estimating a distance to a cause of a micro-reflection may begin by receiving in step 92 coefficients to be used by a pre-equalizer to compensate for a micro-reflection. The pre-equalizer response may preferably be calculated in a CMTS of a head end, such as the head end 22 of FIG. 4. In step 94, it may optionally be determined whether the coefficients produce a response that can be inverted in the z-domain. If not, in step 95 the coefficients may be modified to produce a response capable of inversion, such as by using a polystab function as previously described, and then the response of the modified coefficients may be inverted in step 96. If, conversely, the coefficients are determined to produce a response capable of inversion in step 94, the response can simply be inverted in step 96. It should be understood that in some embodiments, step 94 may be omitted and the coefficients may be modified by step 95 in all cases, and the modified coefficients simply used to produce a response that is inverted in step 96. Once the response is inverted, it is converted back to the time domain and interpolated in step 98. From the interpolated response, a better estimate of the micro-reflection's delay, and hence the distance to the micro-reflection, is calculated in step 99.

Variations on the foregoing time-domain approach to measuring micro-reflection delays, and distances to the cause of a micro-reflection are also possible. As one example, an input stimulus can be provided to a minimum phase, Finite Impulse Response (FIR) digital filter that has been designed with the equalizer's converged set of coefficients, and samples its output at a resolution necessary to achieve enhanced resolution and accuracy of the micro-reflection delay estimate. For example, an impulse δ[n], input may be passed through a filter to estimate a converged response, resulting in an output a[n], which may be examined in a similar manner to the coefficients of the method described in FIG. 23. It should be understood that the input need not be limited to an impulse.

As another example, a cross-correlation function may be applied to an impulse stimulus and a filter output whose implementation is based on the FIR filter just described. The filter input may again be an impulse stimulus, which is provided to the filter and the cross-correlation function simultaneously. The cross-correlation function compares its two inputs, providing a spike indicating the delay at which the two signals become aligned or correlated. Resolution will be adjusted as necessary to achieve enhanced accuracy of the micro-reflection delay estimate. Note again that the input need not be limited to an impulse.

It should be understood that the foregoing techniques may be embodied in any hardware implementation, and in particular may be implemented by the processor 38 in a CMTS of a head end 22 shown in FIG. 4, such that when queried, the CMTS can provide an accurate estimation of the distance to a cause of a micro-reflection by processing the same coefficients that it calculates and provides to a pre-equalizer to mitigate the micro-reflection.

The approaches disclosed above characterize micro-reflection delay from the pre-equalization process, but the disclosure is not limited to this approach. For example, any given network may have many terminal devices including cable modems and set top boxes that can be used to detect and isolate micro-reflection impairments by serving as network test points. Leveraging the CATV network infrastructure for diagnostics and repair is preferable to transporting and connecting test instrumentation into the network for manual measurements.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A method for estimating the distance to a cause of a micro-reflection in a CATV network, the method comprising:
   measuring one or more signals over a CATV network to detect data including a quantification of a micro-reflection delay;
   statistically analyzing the signal to estimate the micro-reflection delay, where statistically analyzing the signal includes calculating a least squares error based on mapping the detected data to a model that satisfies Cramer-Rao Lower Bound (CRLB) for Sinusoidal Parameter Estimation;
   using the estimated micro-reflection delay, a symbol rate, and velocity of propagation to calculate a distance to the cause of the micro-reflection delay.

2. The method of claim 1 where the distance is calculated as:

$$\frac{(\text{symbol period, ns}) * (\text{estimated \# of symbols to micro-reflection})}{\frac{(\text{velocity of propagation, ns/ft})}{2}} \text{ feet,}$$

wherein the symbol period is an inverse of the symbol rate and the # of symbols is determined based on the estimated micro-reflection delay.

3. The method of claim 2 where the calculated distance using the estimated micro-reflection delay has an estimated margin of error of less than:

$$\frac{(\text{symbol period, ns}) * (\text{delay resolution})}{\frac{(\text{velocity of propagation, ns/ft})}{2}} \text{ feet, where the margin of}$$

where the margin of error is reducible as the delay resolution or tap accuracy increases.

4. The method of claim 2 where, for a symbol rate of 5.12 Msps and a velocity of propagation of 87%, the calculated distance has an estimated margin of error of less than 0.835 feet using a first delay resolution of 1/100 or a margin of error of less than 8.35 feet using a second delay resolution of 1/10.

5. The method of claim 1 where statistically analyzing the signal is done in the frequency domain.

6. A method comprising:
   receiving coefficients used by a pre-equalizer to mitigate at least one micro-reflection in a CATV network; and
   calculating at least one of a delay caused by the micro-reflection and a distance to a defect causing the micro-reflection by:
     forming a time domain impulse response based on the received coefficients;
     calculate a minimum phase version of the time domain impulse response by applying an impulse stimulus to a minimum phase, Finite Impulse Response (FIR) digital filter that is based on a converged set of coefficients of the pre-equalizer; and
     sampling the output of the FIR filter based on the converged set of coefficients of the pre-equalizer, wherein the number of complete waveforms is proportional to the delay caused by the micro-reflection and the sample index of the sampled output that is associated with the micro-reflection is translated to distance to provide an estimation of the distance to the defect caused by the micro-reflection.

7. The method of claim 6 including using the coefficients to calculate a response of the CATV network to the micro-reflection and interpolating the response.

8. The method of claim 6 further comprising: applying a cross-correlation function to the FIR filter.

9. A system comprising:
   a pre-equalizer capable of mitigating a micro-reflection in a CATV network; and
   a processor operatively connected to the pre-equalizer and calculating at least one coefficient used by the pre-equalizer to mitigate the micro-reflection,
   where the processor selectively provides a numerical estimate of at least one of a delay caused by the micro-reflection or a distance to a cause of the micro-reflection, the numerical estimate provided using at least one model that satisfies Cramer-Rao Lower Bound (CRLB) for Sinusoidal Parameter Estimation and a least squares error calculation.

10. The system of claim 9 where, for a symbol rate of 5.12 Msps and a velocity of propagation of 87%, the numerical estimate includes a distance to a cause of the micro-reflection that has an estimated margin of error of less than 8.35 feet, using a delay resolution of 1/10.

11. The system of claim 9 where, for a symbol rate of 5.12 Msps and a velocity of propagation of 87%, the numerical estimate includes a distance to a cause of the micro-reflection that has an estimated margin of error of less than 0.835 feet, using a first delay resolution of 1/100.

12. The system of claim 9 where the numerical estimate is calculated using the at least one coefficient.

13. The system of claim 12 where the processor uses the at least one coefficient to calculate a response of the CATV network to the micro-reflection and interpolates the response.

14. The system of claim 12 where the processor samples the output of a Finite Impulse Response (FIR) digital filter based on a converged set of coefficients of the pre-equalizer.

15. The system of claim 14 where the processor applies a cross-correlation function to a FIR digital filter output signal and a stimulus input signal to indicate a delay at which the two signals correlate.

16. The system of claim 15 where the processor samples the output of a Finite Impulse Response (FIR) digital filter based on a converged set of coefficients of the pre-equalizer.

17. A method for estimating the distance to a cause of a micro-reflection in a CATV network, the method comprising:
    measuring one or more signals over a CATV network to detect data including a quantification of a micro-reflection delay;
    statistically analyzing the signal to estimate the micro-reflection delay from the one or more signals, where statistically analyzing the signal includes calculating a least squares error based on mapping the detected data to a model that satisfies Cramer-Rao Lower Bound (CRLB) for Sinusoidal Parameter Estimation;
    using the estimated micro-reflection delay to calculate a distance to the cause of the micro-reflection delay, where distance is calculated by:

$$\frac{(\text{symbol period, ns}) * (\text{estimated \# of symbols to micro-reflection})}{\frac{(\text{velocity of propagation, ns/ft})}{2}} \text{feet,}$$

wherein the symbol period is an inverse of the symbol rate and the estimated # of symbols is determined based on the estimated micro-reflection delay,
    where the calculated distance has an estimated margin of error of less then:

$$\frac{(\text{symbol period, ns}) * (\text{delay resolution})}{\frac{(\text{velocity of propagation, ns/ft})}{2}} \text{feet.}$$

18. A method comprising:
    receiving coefficients used by a pre-equalizer to mitigate at least one micro-reflection in a CATV network;
    performing at least one mathematical operation on the coefficients to calculate at least one of a delay caused by the micro-reflection and a distance to a defect causing the micro-reflection by:
        forming a time domain impulse response based on the received coefficients;
        calculate a minimum phase version of the time domain impulse response by applying an impulse stimulus to a minimum phase, Finite Impulse Response (FIR) digital filter that is based on a converged set of coefficients of the pre-equalizer; and
        applying a cross-correlation function to the FIR filter for comparing the impulse stimulus and FIR filter output to determine a point where the cross-correlation function inputs become aligned to estimate the delay caused by the micro-reflection for translating to an estimated distance to the defect causing the micro-reflection.

19. The method of claim 18 including using the coefficients to calculate a response of the CATV network to the micro-reflection and interpolating the response.

20. The method of claim 18 further comprising sampling the output of the FIR filter.

21. A system comprising:
    a pre-equalizer capable of mitigating a micro-reflection in a CATV network; and
    a processor operatively connected to the pre-equalizer and calculating at least one coefficient used by the pre-equalizer to mitigate the micro-reflection,
    where the processor selectively provides a numerical estimate of at least one of a delay caused by the micro-reflection or a distance to a cause of the micro-reflection by statistically analyzing the signal to estimate the micro-reflection delay from the one or more signals, where statistically analyzing the signal includes calculating a least squares error based on mapping the detected data to a model that satisfies Cramer-Rao Lower Bound (CRLB) for Sinusoidal Parameter Estimation;
    the estimated distance to a cause of the micro-reflection determined by calculating:

$$\frac{(\text{symbol period, ns}) * (\text{estimated \# of symbols to micro-reflection})}{\frac{(\text{velocity of propagation, ns/ft})}{2}} \text{feet,}$$

where the symbol period is an inverse of the symbol rate and the # of symbols is determined from the numerical estimate of the delay caused by the micro-reflection, and
    where an estimated margin of error of the calculated distance is reducible by a factor of 100 for a delay resolution of $1/100^{th}$ or by a factor of 10 for a delay resolution of $1/10$th.

* * * * *